United States Patent
Arai et al.

(10) Patent No.: US 8,941,920 B2
(45) Date of Patent: Jan. 27, 2015

(54) METHOD OF PRODUCING OPTICAL ELEMENT AND OPTICAL ELEMENT

(75) Inventors: Kazuhiro Arai, Yokohama (JP); Jun-ichi Sakamoto, Yokohama (JP); Junji Terada, Tokyo (JP); Noriyuki Nakai, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 976 days.

(21) Appl. No.: 13/055,663

(22) PCT Filed: Jul. 7, 2009

(86) PCT No.: PCT/JP2009/063704
§ 371 (c)(1),
(2), (4) Date: Jan. 24, 2011

(87) PCT Pub. No.: WO2010/013821
PCT Pub. Date: Feb. 4, 2010

(65) Prior Publication Data
US 2011/0123765 A1    May 26, 2011

(30) Foreign Application Priority Data

| | | |
|---|---|---|
| Jul. 28, 2008 | (JP) | 2008-193696 |
| Jun. 30, 2009 | (JP) | 2009-155669 |
| Jul. 16, 2009 | (JP) | 2009-167908 |

(51) Int. Cl.
G02B 5/30    (2006.01)
G02B 5/18    (2006.01)
G02B 27/28   (2006.01)

(52) U.S. Cl.
CPC ............ G02B 5/1809 (2013.01); G02B 5/30 (2013.01); G02B 27/28 (2013.01)
USPC ................... 359/489.06; 359/483.01

(58) Field of Classification Search
None
See application file for complete search history.

(56) References Cited

U.S. PATENT DOCUMENTS

2004/0095637 A1 *  5/2004  Nikolov et al. ........... 359/352
2007/0201135 A1    8/2007  Sakamoto et al.

FOREIGN PATENT DOCUMENTS

| | | |
|---|---|---|
| JP | 2005-534981 A | 11/2005 |
| JP | 2006047663 A  | 2/2006 |
| JP | 2006-330178 A | 12/2006 |
| JP | 2007-264604 A | 10/2007 |
| WO | 2004013684 A2 | 2/2004 |

* cited by examiner

*Primary Examiner* — Derek S Chapel
(74) *Attorney, Agent, or Firm* — Canon USA Inc. IP Division (57) ABSTRACT

Provided are an optical element and a method of producing an optical element in which sufficient adhesion with an upper layer can be secured without damaging spectral characteristics. The production method includes the step of forming a first structural body in which a space part and a structural part are alternately and repeatedly arranged, the step of forming an etching stopper layer on an upper part of the structural part, and the step of forming a second structural body on the etching stopper layer by etching.

7 Claims, 8 Drawing Sheets

METHOD OF PRODUCING OPTICAL ELEMENT AND OPTICAL ELEMENT

TECHNICAL FIELD

The present invention relates to a method of producing an optical element and an optical element. For example, the present invention relates to an optical element with a three-dimensional structural body which has a three-dimensional hollow structure for obtaining an optical element such as a polarizing beam splitter, a phase plate, or a band-pass filter which has, on a surface thereof, a structure with an in-plane period shorter than a wavelength of visible light, and a method of producing the same.

BACKGROUND ART

In recent years, an optical element which attempts to realize a polarization optical characteristic using a three-dimensional structure has been developed. Such an optical element, which has a three-dimensional structural body, is disclosed in, for example, U.S. Published Application No. 2007-0201135. A hollow structure is formed in a layer to realize a low refractive index which is not present in a bulk. Furthermore, anisotropy is obtained in an in-plane direction as in a line-and-space structure, so that a high polarization characteristic is realized.

Such a hollow structure is formed using a photolithography process and/or a dry etching technology.

Furthermore, in the case of obtaining a structure which is optically transparent, a dielectric material is generally used as a structural material.

Furthermore, in order to obtain a three-dimensional structure stacked, a space is filled with a material, which is called a sacrificial layer and can be removed in a subsequent step, and a planarizing process is performed. Thereafter, a second layer is deposited and patterned using a photolithography process and/or a dry etching technology.

Then, the sacrificial layer is subjected to ashing from the space of the second layer, and a part in which the sacrificial layer of a first layer has been filled is used as a hollow structure.

In the case where an optical element with a three-dimensional structural body is produced using the above-described conventional method, the first and the second layers may be made of dielectric materials. In this case, if the second layer is not accurately etched using, for example, a time control method, the first layer may be etched, that is, over-etching may occur, or the second layer may not be etched out and partially remain, that is, under-etching may occur.

Furthermore, even though accurate etching is performed, if a large-size base of 6 inches or 8 inches is used as a process base, a process may not be performed uniformly over the whole base surface.

In addition, when the second layer is over-etched and so the first layer is also etched, a part which is extremely small in refractive index is generated. Therefore, it becomes difficult to obtain desired optical characteristics.

Furthermore, when the second layer is under-etched, it is difficult to ash the sacrificial layer which remains in the space of the first layer.

For the forgoing reasons, a hollow structure can not be formed in the first layer, and the refractive index becomes higher. It is also difficult to obtain desired optical characteristics.

In addition, when ions collide with a sidewall, side-etching is performed. As a result, an area of a part which is coupled with a second structural body becomes smaller, and the bonding strength between a first structural body and the second structural body lowers.

DISCLOSURE OF THE INVENTION

The present invention has been accomplished in consideration of the above-described problems, and it is an object of the present invention to provide a method of producing an optical element and an optical element in which sufficient adhesion with an upper layer is secured without degrading spectral characteristics.

According to an aspect of the present invention, there is provided a method of producing an optical element which includes a first and a second structural bodies on a base, including: the step of forming a first structural body in which a space part and a structural part are alternately and repeatedly arranged; the step of forming an etching stopper layer on an upper part of the structural part; and the step of forming a second structural body on the etching stopper layer by etching.

According to an embodiment of the present invention, there is provided an optical element including a first structural body and a second structural body on a base, further including a junction body which is formed on an upper part of the first structural body and has an area larger than a cross-sectional area of the first structural body in a direction parallel to an upper surface of the base, wherein the first and the second structural bodies are coupled to each other through the junction body.

According to the present invention, an optical element with a three-dimensional structural body and a method of producing the optical element in which sufficient adhesion with an upper layer is secured without damaging spectral characteristics can be realized.

Further features of the present invention will become apparent from the following description of exemplary embodiments with reference to the attached drawings.

BEST MODE FOR CARRYING OUT THE INVENTION

Hereinafter, embodiments of the present invention will be described in detail.

Method of Producing an Optical Element According to a First Embodiment

Figure 1A:
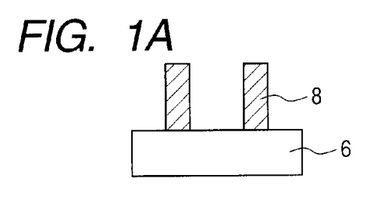
FIGS. 1A, 1B, 1C, 1D and 1E and FIGS. 1A', 1B', 1C', 1D' and 1E' are schematic views illustrating a method of producing an optical element according to a first embodiment of the present invention.

First, a method of producing an optical element according to a first embodiment of the present invention will be described. FIGS. 1A to 1E are views illustrating steps of a method of producing an optical element according to the first embodiment of the present invention. FIGS. 1A' to 1E' are step views in which FIGS. 1A to 1E are seen in a direction indicated by a thick outline arrow.
(Step of Forming a First Structural Body)

First, a first structural body is formed on a base. For an example of the first structural body, a step of forming a repetition structure in which a space part (space) and a structural part are alternately and repeatedly arranged at a pitch less than a wavelength of visible light is performed as follows. As illustrated in FIGS. 1A and 1A', a space part (space) and a structural part 8 are alternately and repeatedly arranged on a transparent base 6 at a pitch less than a wavelength of visible light to form the first structural body. The structural part 8 may be formed of titanium oxide for example. A titanium oxide film is first deposited using a sputtering technology. A photoresist layer is patterned using general light exposure/development steps, and space parts of the titanium oxide film are etched using a dry etching technology. Thereafter, a remaining photoresist is removed by an appropriate solvent, whereby the structural parts 8 are formed. Here, the material for forming the structural part 8 is not limited to titanium oxide but may include a material which can be etched. For example, the structural part 8 may be made of silicon oxide, a mixed film of titanium oxide and silicon oxide, a mixed film of titanium oxide and zirconium oxide, or a mixed film of titanium oxide and hafnium oxide.
(Step of Forming an Etching Stopper Layer)

Figure 1B:
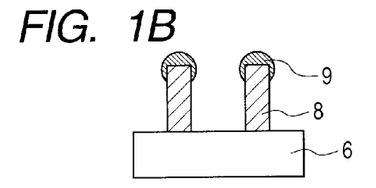

Next, a step of forming an etching stopper layer on an upper part (top part) of the structural part 8 is performed as follows. As illustrated in FIGS. 1B and 1B', an etching stopper layer 9 is formed on a top part of the structural part 8. The etching stopper layer 9 may be made of one selected from aluminum oxide ($Al_2O_x$, $x \leq 3$), zirconium oxide ($Z_rO_x$, $x \leq 2$), hafnium oxide ($H_fO_x$, $x \leq 2$), and yttrium oxide ($Y_2O_x$, $x \leq 3$). As a method of forming the etching stopper layer, a magnetron sputtering technology, which uses an oblique incidence, may be used.

Figure 10:
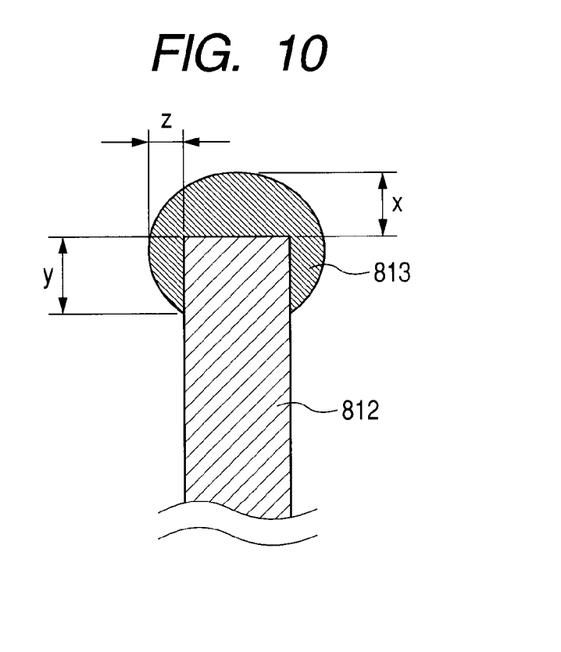
FIG. 10 is an enlarged view of an upper portion of a structural part.

FIG. 10 is an enlarged view of the top part of the structural part 8. A distance x from the top surface of the structural part 8 to the uppermost part of the etching stopper layer 9, a distance y from the top surface of the structural part 8 to the lowest part of the etching stopper layer 9, and a distant z from the side of the structural part 8 to the end part of the etching stopper layer 9 may be determined mainly by the following factors:

Distance x: etching rate selectivity and optical function;
Distance y: optical function; and
Distance z: line height and optical function.
If the etching stopper layer is too large, since the optical function of the element may get damaged, the distances x, y and z have upper limit values. In the present embodiment, for example, the distances x and y have upper limit values of about 40 nm, and the distance z has an upper limit value of about 20 nm. For example, in the present embodiment, the etching stopper layer 9 has a shape such that the distance x is about 20 nm, the distance y is about 20 nm, and the distance z is about 18 nm.

However, the present invention is not limited to the above distance values. For example, the highest part of the etching stopper layer may be within a range of 0.1 nm or more and 40 nm or less from the top surface of the structural part. Furthermore, the lowest part of the etching stopper layer may be within a range of 0 nm or more and 40 nm or less from the top surface of the structural part. Moreover, the end of the etching stopper layer may be within a range of 0.1 nm or more and 20 nm or less from the side of the structural part.
(Step of Forming a Second Structural Body)

Next, a second structural body is stacked on the etching stopper layer.

Figure 1C:
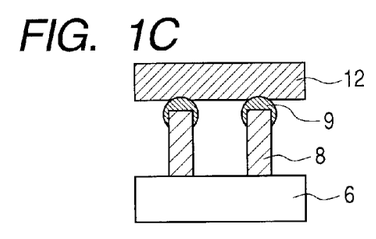
Figure 1D:
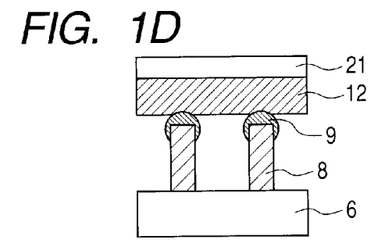

As the second structural body, a line-and-space structure is formed in a direction nearly perpendicular to a line-and-space structure of the first structural body. As illustrated in FIGS. 1C and 1C', the second structural body is formed on the etching stopper layer 9, which is formed on the structural part 8 of the first structural body, using, for example, a tenting sputtering process. This film may be made of a material, which can be etched, as well as titanium oxide. For example, this film may be made of silicon oxide, a mixed film of titanium oxide and silicon oxide, a mixed film of titanium oxide and zirconium oxide, or a mixed film of titanium oxide and hafnium oxide. Furthermore, a layer made of, for example, titanium oxide may be formed on the etching stopper layer by, for example, bonding. Thereafter, as illustrated in FIGS. 1D and 1D', a photoresist layer 21 is patterned by light exposure/development steps.

Figure 1E:
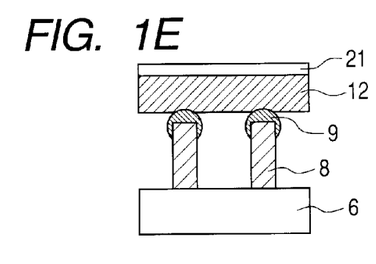

Next, as illustrated in FIGS. 1E and 1E', the photoresist layer 21 is used as a mask to etch space parts using a dry etching process.

Figure 11:
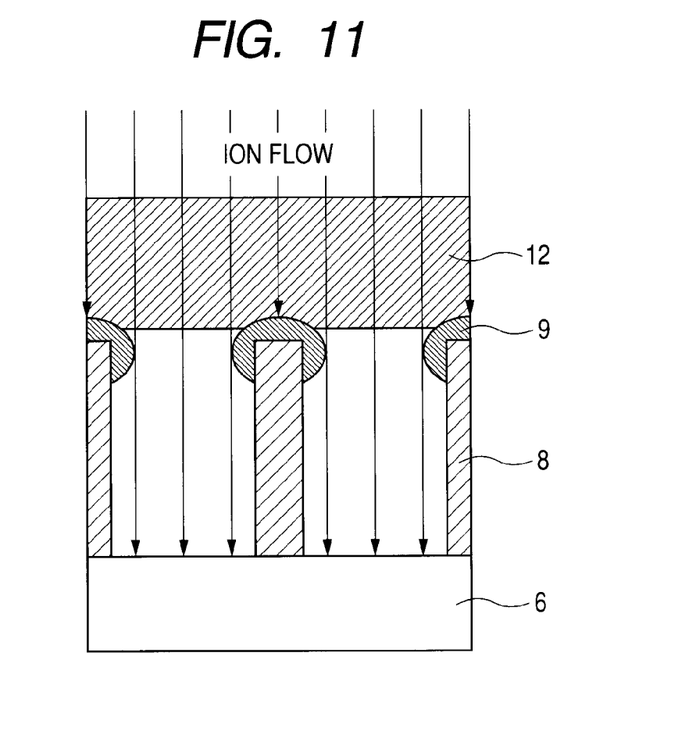
FIG. 11 is a schematic diagram illustrating ion flow at the time of etching.

FIG. 11 illustrates the ion flow at the time of etching. As can bee seen from FIG. 11, due to the etching stopper layer 9, the shape of the structural part 8 of the first structural body is conserved. In particular, since the etching stopper layer 9 which protrudes from the side of the structural part serves as the eaves, collision of ions with the sidewall of the structural part is inhibited. As a result, side-etching can be prevented. Thus, by forming the etching stopper layer on the top part of the structural part, it is possible to prevent the shape of the structural body from changing. Accordingly, an optical element without a variation in optical characteristics can be stably produced.

Optical Element According to the First Embodiment

Figure 2:
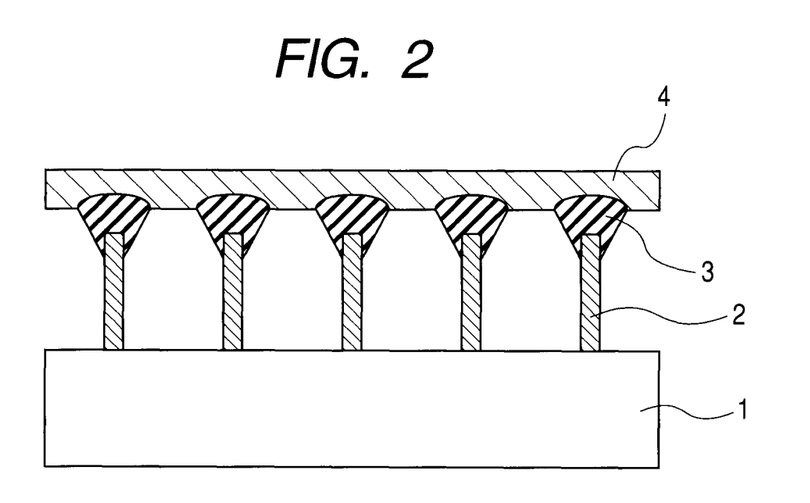
FIG. 2 is a schematic view illustrating an optical element according to the first embodiment of present invention.

Next, an optical element produced according to the first embodiment will be described. FIG. 2 is a cross-sectional view illustrating a configuration of the optical element according to the present embodiment.

Reference numeral 1 denotes a base, reference numeral 2 denotes a first structural body, reference numeral 3 denotes a junction body (etching stopper layer), and reference numeral 4 denotes a second structural body. In FIG. 2, since lines and spaces of the second structural body are parallel to the drawing plane, a space part (space) is not illustrated.

An optical element of the present embodiment includes at least the first structural body 2 and the second structural body 4 on the base 1. The first structural body 2 and the second structural body 4 have a repetition structure in which a space part and a structural part are alternately and repeatedly arranged at a pitch less than a wavelength of visible light. A junction body 3, which has an area larger than a cross-sectional area of the structural part in a direction parallel to a top surface of the base, is formed on a top surface of the structural part of the first structural body. The first structural body 2 and the second structural body 4 are coupled to each other through the junction body. The junction body 3 functions as an etching stopper layer in the production process. In the case where the etching stopper layer is rounded to be formed on the top part of the first structural body, the contact area between the first structural body and the junction body (the etching stopper layer) increases. As a result, adhesion between the first structural body and the junction body becomes stronger. In the present embodiment, since a layer for forming the second structural body is formed using a tenting sputtering process, a layer for forming the second structural body is formed to surround the junction body 3, which has an area larger than a cross-sectional area of the structural part in a direction parallel to the top surface of the base. Therefore, the junction area increases, and the junction body and the second structural body can be coupled more strongly. As a result, the first and the second structural bodies are firmly coupled.

The base may include a plurality of layers for adjusting the spectral characteristics. Furthermore, the plurality of layers may be structural bodies or may include the first structural body 2 and the second structural body 4 described above.

Furthermore, in the first structural body or the second structural body, the repetition structure may include any one of a line and space structure, a hole structure and a dot structure. Since the line and space structure has a polarization characteristic with respect to incident light, the line and space structure are effective in obtaining an optical element such as a polarizing beam splitter, a phase plate and a band-pass filter. Furthermore, the hole or dot structure can obtain a polarization characteristic by an arrangement having a variation within a plane. Furthermore, in the hole or dot structure, a polarization effect can be canceled by a uniform arrangement of an in-plane direction. As an optical element for canceling a polarization effect, there are an anti-reflection film, a band-pass filter, and a high reflection film. In the first structural body 2 and the second structural body 4, the pitch of the repetition structure is less than a wavelength of visible light, for example, 200 nm. When the light is incident to the structure having a pitch equal to or more than a wavelength of visible light, diffraction light of high degree is generated, and thus it is difficult to obtain desired spectral characteristics. For this reason, the pitch is required to be less than a wavelength of visible light. Furthermore, when the pitch is equal to or less than one second (½) of a wavelength of visible light, it is possible to suppress first order diffraction light from being generated. Therefore, when the wavelength band of a visible range is defined as 400 nm to 700 nm, generation of diffraction light can be suppressed in the whole visible range at a pitch which is one second of a shortest wavelength 400 nm. Furthermore, the repetition structures of the first and second structural bodies may be made of the same material, for example, a dielectric material. For example, the repetition structures may be made of titanium oxide, silicon oxide, a mixed film of titanium oxide and silicon oxide, a mixed film of titanium oxide and zirconium oxide, or a mixed film of titanium oxide and hafnium oxide.

Method of Producing an Optical Element According to a Second Embodiment

Next, an optical element and a method of producing an optical element according to a second embodiment will be described with reference to FIGS. 3A to 3G. The same parts as those of the first embodiment have the same reference numerals, and thus duplicated descriptions will not be repeated.

(Step of Forming a First Structural Body)

Figure 3A:
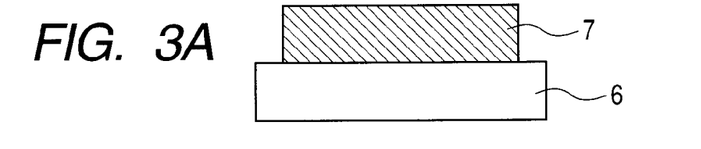
FIGS. 3A, 3B, 3C, 3D, 3E, 3F, and 3G are schematic views illustrating a method of producing an optical element according to a second embodiment of the present invention.
Figure 3B:
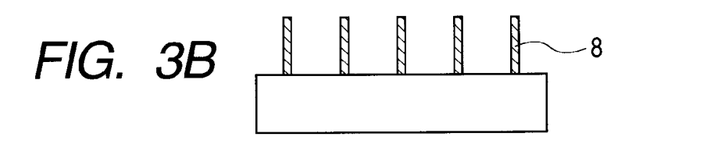

A layer 7 for forming a first structural body is formed on a base 6 (FIG. 3A). A first structural body having a repetition structure in which a space part (space) and a structural part 8 are alternately and repeatedly arranged at a pitch less than a wavelength of visible light is formed (FIG. 3B).

(Step of Forming an Etching Stopper Layer)

Figure 3C:
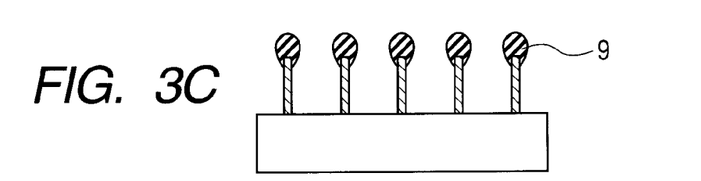

Next, an etching stopper layer 9 is formed on the structural part 8 of the first structural body (FIG. 3C).

(Step of Covering the First Structural Body and the Etching Stopper Layer with a Planarizing Layer)

Figure 3D:
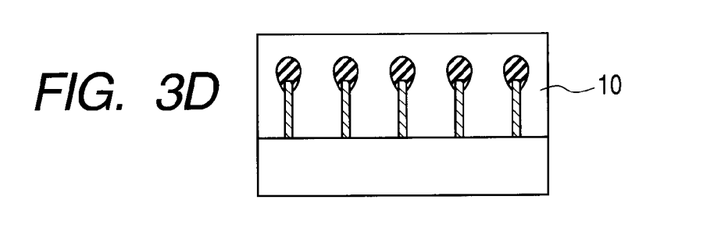

Next, the whole area, which includes the space part of the repetition structure of the first structural body and the etching stopper layer, is covered with a sacrificial layer, whereby a planarizing layer (the sacrificial layer) 10 is formed on the first structural body (FIG. 3D).

(Polishing Step)

Figure 3E:
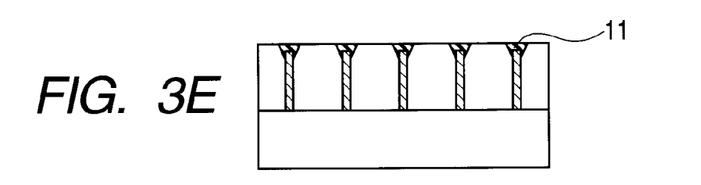

Next, the planarizing layer formed on the first structural body is polished (lapped) up to the middle of the etching stopper layer to thereby form a planarizing part 11 (FIG. 3E).

(Step of Forming a Second Structural Body)

Figure 3F:
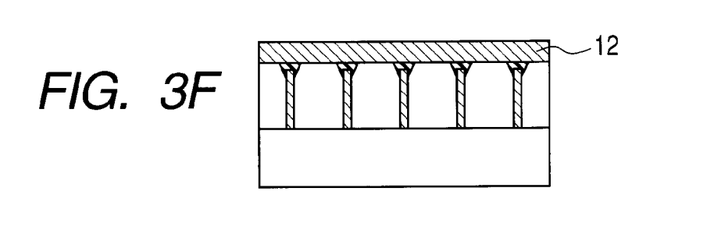

Next, a layer for forming a second structural body is deposited on the etching stopper layer including the planarizing part 11 in the first structural body to thereby form a second structural body 12 (FIG. 3F). At this time, as the second structural body 12, a repetition structure in which a space part (space) and a structural part are alternately and repeatedly arranged at a pitch less than a wavelength of visible light is formed in the deposited layer (not illustrated).

(Step of Removing the Sacrificial Layer)

Figure 3G:
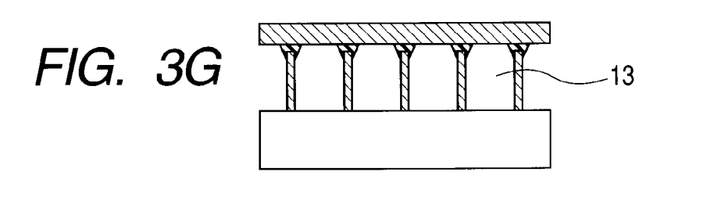

After forming the second structural body, the sacrificial layer, which is filled in the space part of the repetition structure of the first structural body, is removed. As a result, a hollow part (a gap) 13 is formed (FIG. 3G).

Optical Element According to the Second Embodiment

Figure 4:
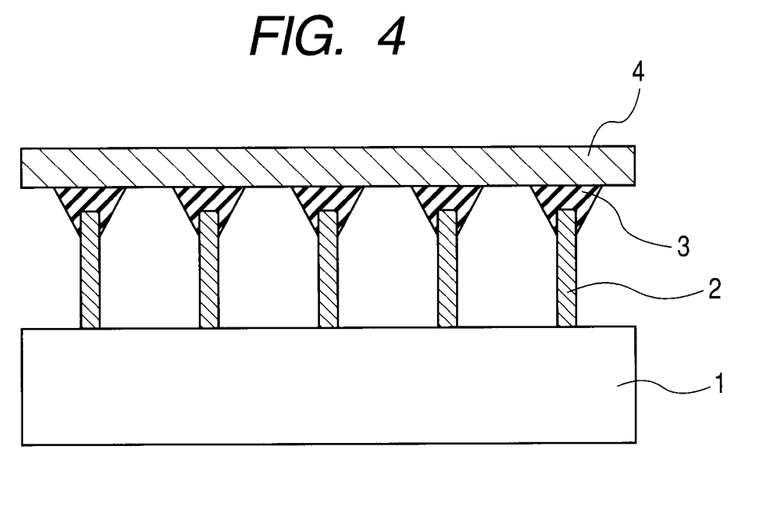
FIG. 4 is a schematic view illustrating an optical element according to the second embodiment of present invention.

FIG. 4 illustrates an optical element produced according to the second embodiment. In the optical element according to the present embodiment, polishing is performed up to the middle of the junction body 3 (the etching stopper layer). Performing polishing up to the middle of the junction body 3 means that polishing is performed up to a range in which a cross-sectional area of the junction body 3 in a direction parallel to the top surface of the base 1 is larger than a cross-sectional area of the structural part of the first structural body in a direction parallel to the top surface of the base 1. As a result, the top surface of the junction body 3 (the etching stopper layer) which contacts the second structural body 4 can have an area larger than an area of the structural part 2 of the first structural body in a direction parallel to the top surface of the base 1. Therefore, the adhesion between the junction body and the second structural body 4 formed thereon increases.

Third Embodiment

Next, an optical element and a method of producing an optical element according to a third embodiment will be described with reference to FIGS. 5A to 5H. The same parts as those of the first embodiment or the second embodiments have the same reference numerals, and thus duplicated descriptions will not be repeated.

In the method of producing an optical element according to the present embodiment, a step of forming a first structural body (FIG. 5A) to a polishing step (FIG. 5E) are identical to those of the second embodiment.

(Etch-Back Step)

In the present embodiment, after the polishing step of the second embodiment, the sacrificial layer is etched back up to an interface between the structural part 8 of the first structural body and the etching stopper layer 9.

Figure 5A:
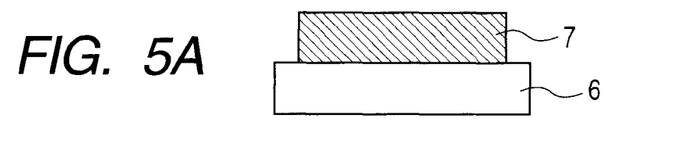
FIGS. 5A, 5B, 5C, 5D, 5E, 5F, 5G and 5H are schematic views illustrating a method of producing an optical element according to a third embodiment of the present invention.
Figure 5B:
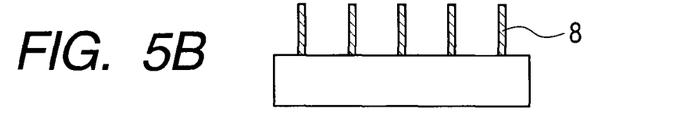
Figure 5C:
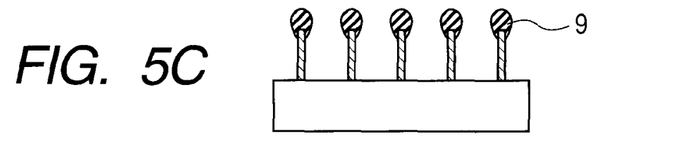
Figure 5D:
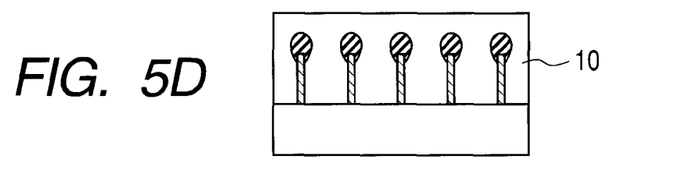
Figure 5E:
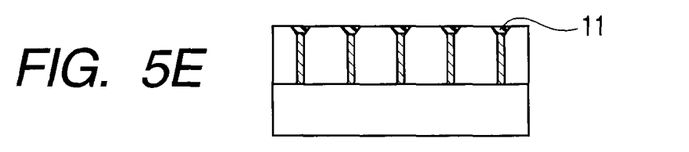
Figure 5F:
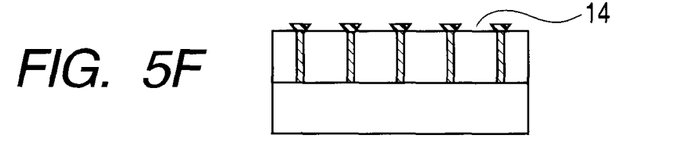

As a result, the etching stopper layer 9 is exposed from an area surface, which is filled with the sacrificial layer, to form an exposed surface, and a gap 14 is formed between the adjacent etching stopper layers (FIG. 5F).

(Step of Forming a Second Structural Body)

Figure 5G:
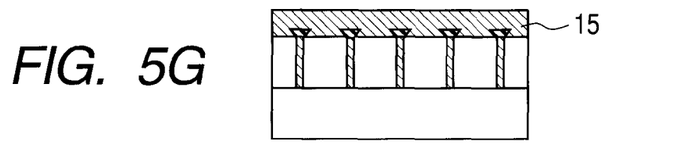

Next, a layer for forming a second structural body is deposited on a surface of an area which is filled with the sacrificial layer and the first structural body including the exposed part of the etching stopper layer, so that a second structural body 15 is formed (FIG. 5G). At this time, as the second structural body 15, a repetition structure in which a space part and a structural part are alternately and repeatedly arranged at a pitch less than a wavelength of visible light is formed in the deposited layer (not illustrated).

(Step of Removing the Sacrificial Layer)

Figure 5H:
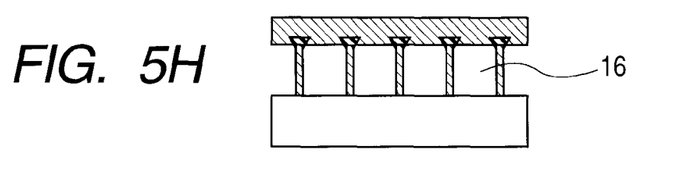

Next, the sacrificial layer filled in the space of the repetition structure of the first structural body is removed. As a result, a hollow part (a gap) 16 is formed (FIG. 5H).

Optical Element According to the Third Embodiment

Figure 6:
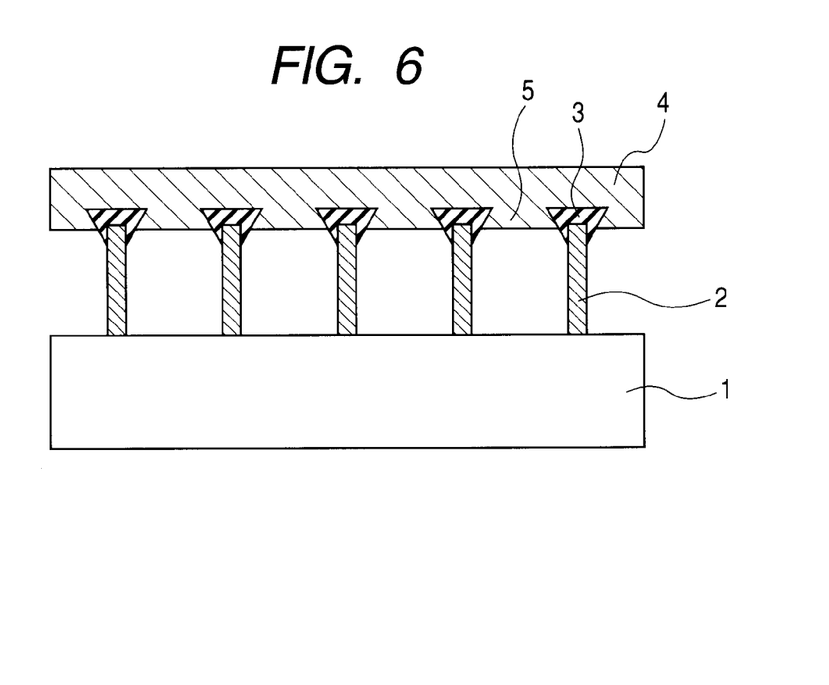
FIG. 6 is a schematic view illustrating an optical element according to the third embodiment of present invention.

FIG. 6 illustrates an optical element produced according to the third embodiment. The optical element according to the present embodiment may have a configuration in which the gap 5 between the adjacent junction bodies 3 is filled. For example, a material for filling the gap may be the same material as the repetition structure of the first structural body or the same material as the repetition structure of the second structural body. The junction body having the gap may have a low refractive index depending on a used material. In order to prevent such a problem, it is effective to fill the gap of the junction body with a different material. The filling material preferably includes a material in which the same etching can be performed under etching conditions at the time of forming the second structural body. That is, a material through which a desired refractive index is obtained may be used as the filling material, and the filling material is not limited to a particular material. According to a configuration of the present embodiment, the gap of the stop layer is filled with a different material as needed, so that an area having a low refractive index is not formed. Accordingly, an optical element having desired spectral characteristics can be obtained.

As described above, according to the method of producing the optical element of the present invention, the etching stopper layer does not need an etching process using a photolithography process, and thus it is possible to use an anti-etching material. In the case of forming such a stopper, an advantage of a material which is difficult to be etched is considered, a pattern can be formed while succeeding the structure of a lower layer, even though patterning is not performed.

Furthermore, according to the present invention, planarization is performed by a polishing (lapping) process, and an area which contacts with an upper layer is increased, so that the adhesion with the upper layer increases. Furthermore, since a stopper made of an anti-etching material is present, when the second structure body is patterned, a shape of the first structure body does not get damaged even though etching time greatly increases and patterning is performed so that an overall surface of the base can be used. In addition, since the gap of the second structural body is sufficiently etched, a defect can be suppressed in which spectral characteristics are degraded because the sacrificial layer remains in the gap of the first structural body due to poor shaping of the gap. Furthermore, the gap of the stopper layer may be filled with a different material as needed, so that an optical element having desired spectral characteristics can be obtained without providing an area in which the refractive index is small.

EXAMPLES

Hereinafter, examples of the present invention will be described.

Example 1

In Example 1, an optical element to which the second embodiment is applied and a method of producing the same will be described.

Figure 7:
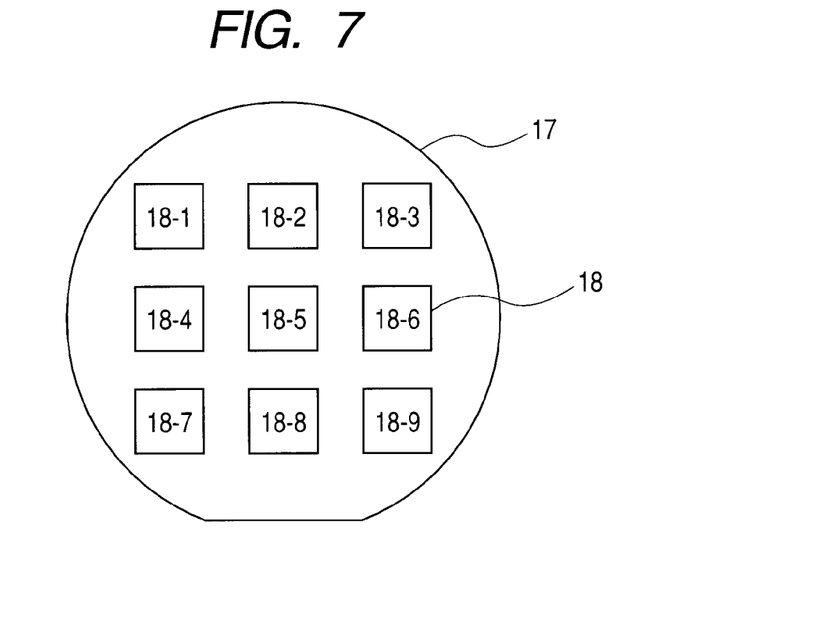
FIG. 7 is a schematic view illustrating a configuration example according to Example 1 of the present invention.

FIG. 7 illustrates a configuration example of a base and a pattern arrangement of an optical element with a three-dimensional structural body according to Example 1. Here, a configuration example in which 9 patterns 18 of 25 mm square are formed on a 6-inch optical glass wafer base 17 (SF6 (trade name); manufactured by SCHOTT) will be described.

A method of producing an optical element according to Example 1 will be described with reference to FIGS. 3A to 3G. First, a step of forming a first structural body will be described. In Example 1, at the time of patterning to form a first structural body, a 6-inch optical glass wafer base 6 (SF6 (trade name); manufactured by SCHOTT) was cleaned and dried. Thereafter, titanium dioxide was deposited thereon in a thickness of 300 nm using a sputtering process to form a layer 7 for forming a first structural body (FIG. 3A).

Next, in order to adjust a pattern line width of titanium dioxide and perform etching at a high selectivity, a chromium layer and a silicon dioxide layer were formed as a hard mask in a thickness of 50 nm and a thickness of 100 nm, respectively, using a sputtering process.

Next, a photolithography step was performed. First, a bottom anti-reflective coating (BARC) (KrF17B (trade name); manufactured by Clariant) layer for patterning was formed in a thickness of 100 nm using a spin coating process. Thereafter, pre-backing was performed at 150° C. for one minute. Then, as a photoresist, AX6850P (trade name; manufactured by Clariant) was coated in a film thickness of 140 nm using a spin coating process.

Next, after the coating process, pre-baking was performed at 110° C. for two minutes.

Thereafter, the base was subjected to a light exposure/development process. The light exposure was performed using a dual-beam interference exposure process. As a light source, used was a laser which has a wavelength of 266 nm which is the fourth harmonic of an Nd-YAG laser, a beam diameter of $\phi 1$ nm and is a continuous oscillation type of 200 mW. A beam, which is expanded by passing the laser beam through a beam expander with 100 magnifications, was divided into two beams, which have equal light amounts, through a beam splitter.

Then, the light exposure was performed in such a way that a laser beam was incident at an incident angle of 72°, through a folding mirror, from a location which faces an exposure surface normal line of the base on which the resist is coated. Exposure time was four seconds.

In Example 1, patterning was performed using an interference exposure process. However, as long as desired pattern is obtained, patterning may be performed using a stepper, an electron beam (EB) lithography apparatus, or an X-ray exposure apparatus.

After the light exposure process, a post exposure bake (PEB) process was performed at 120° C. for two minutes.

Thereafter, the base was immersed in a development solution containing 2.38% of tetramethyl ammonium hydroxide (TMAH) and then rinsed by a pure water shower to obtain a line-and-space pattern of the resist. The line width obtained was 70 nm.

Subsequently, the BARC layer was etched. The etching process was performed with a reactive ion etching (RIE) apparatus of a parallel plate type. Oxygen of 10 sccm and $CHF_3$ of 50 sccm were supplied to a chamber, and at the same time, the pressure was adjusted through a conductance valve to be maintained at 3 Pa. The etching process was performed at RF power of 20 W for 300 seconds, whereby etching of the BARC layer was completed.

Next, the silicon dioxide layer was etched through a RIE apparatus of a parallel plate type. The etching process was performed at pressure of 2.7 Pa and RF power of 100 W (0.3 W/cm$^2$) for 260 seconds using $CHF_3$ as an etching gas.

Thereafter, the patterned silicon dioxide was used as a mask to etch the chromium layer and the titanium dioxide layer. An inductivity coupled plasma (ICP) apparatus was used as an etching apparatus.

The chromium layer was etched at a pressure of 6 Pa, a RF power of 50 W, a base bias of 120 W for 100 seconds using a mixed gas in which chlorine and oxygen were mixed at a ratio of 1:3 as an etching gas.

The titanium oxide layer was etched at a pressure of 5 Pa, an RF power of 300 W, a base bias of 30 W for 25 minutes using sulfur hexafluoride as an etching gas.

Then, the remaining chromium layer was immersed in an etchant in which 165 g of cerium(IV) ammonium nitrate and 43 cc of perchloric acid were mixed and diluted with 1 L of pure water to be subjected to wet etching. Thereafter, washing with water was sufficiently performed.

The first structural body 8 was formed through the above-described steps (FIG. 3B).

The line-and-space structure of the first structural body had a shape in which the line was 56 nm, the space was 84 nm, and the pitch was 140 nm. Furthermore, it was possible to control the line width of the titanium dioxide layer by adjusting appropriately the condition so that the mask layer of chromium and silicon dioxide can be etched in a tapered shape. Furthermore, the material of the mask layer is not limited to the materials described above, and the mask layer may be made of any material which is capable of obtaining selectivity at which the first structural body is satisfactorily etched. Depending on the cases, it was possible to perform direct etching using a photoresist.

Next, a step (FIG. 3C) of forming an etching stopper layer was performed as follows. Aluminum oxide was used as a material of the stopper layer. Aluminum oxide was deposited using a sputtering process. In order to form the etching stopper layer, aluminum was used as a target, and RF discharge was performed at a power of 800 W using an argon gas in which oxygen of 4 vol % was mixed. The layer was formed while rotating a base stage on which a base having the first structural body and a flat base for evaluating a layer thickness are placed above the target. After the etching stopper layer was formed, the layer thickness was measured and found to be 40 nm through the layer thickness evaluating base.

Furthermore, a base on which the first structural body formed under the same condition was formed was cut, and its cross section was observed through an electron microscope. As a result, it was confirmed that the aluminum oxide stopper layer 9 of a dome shape was formed on the top part of the structural body, as shown in FIG. 3C.

Next, a step (FIG. 3D) of covering the first structural body and the etching stopper layer with a planarizing layer was performed as follows.

As a covering material (also referred to as "filling material"), AZ Exp. KrF-17C8 (trade name; manufactured by Clariant) was used. The covering process was performed using a spin coating process. The spin coating process was performed at 2500 rpm for 30 seconds, and then pre-baking was performed at 180° C. for one minute. The above-described process was repeated three times to complete the covering process. As a result, the covering planarizing layer 10 was formed at a height of about 150 nm from a top surface of the aluminum oxide pattern. Thereafter, a polishing step (FIG. 3E) was performed as described below to perform planarization.

The planarizing process was performed with a lapping apparatus. That is, the base was placed on a rotation stage and was rotated at a rotation speed of 2 rpm while supplying pure water, and a lapping head having a lapping film was downwardly pressurized and slided. The planarizing process was performed for 300 seconds.

As the lapping film, a lapping film manufactured by 3M Company (#15000 (trade name)) was used.

As a result, as illustrated in FIG. 3E, the etching stopper layer was planarized together with the planarizing layer, so that a planarized part 11 was obtained.

Here, a process used for planarization may include various processes such as a polishing process, a lapping process, and a chemical mechanical polishing (CMP) process. That is, a technique which can planarize the filling material and the etching stopper layer material may be used, and it is not limited to a particular technique.

Next, a step (FIG. 3F) of forming a second structural body was performed as follows.

In order to form the second structural body, a titanium dioxide layer was formed on the planarized etching stopper layer in a thickness of 66 nm using a sputtering process. As a result, a titanium dioxide layer 12 which was excellent in surface flatness and was continuous and uniform was obtained.

Thereafter, similar to the first titanium dioxide layer, a chromium layer, a silicon dioxide layer, a BARC layer, and a photoresist layer were formed. Thereafter, a light exposure process was performed, and then etching of a mask layer was performed. Etching conditions for each of the above-described layers were optimized so that the second titanium dioxide layer had a line width of 112 nm.

Then, a step (FIG. 3G) of removing the sacrificial layer was performed as follows.

An ashing process was performed using oxygen gas with an RIE apparatus. The ashing process was performed at a pressure of 3 Pa and a power of 100 W for three minutes. The sacrificial layer filled in a space part of a first layer was removed to obtain a hollow part 13.

As described above, a three-dimensional structure using titanium dioxide of a two-layer structure was obtained.

In all of 9 patterns on a 6-inch plane, a range of 25 mm square in which a pattern was formed was externally uniform, and even though a nitrogen blow of 0.5 MPa was performed, their appearance did not change and had a satisfactory structure. Furthermore, a central part of a pattern was cut and its cross section was observed through a field emission-scanning electron microscope (FE-SEM). As a result, it was confirmed that the first and the second layers were firmly adhered to each other through the etching stopper layer.

Such a structural body functions as an optical phase plate.

Furthermore, in the present example, the film formation was performed by a sputtering process. However, a technique which can form a dielectric material film such as a vacuum evaporation process, a CVD process, or a wet film forming process may be used, and the process is not particularly limited.

Reference Example 1

A sample was produced by following the same procedure as in Example 1 with the exception that a RIE etching system was used instead of the polishing process of Example 1.

An ashing process was performed under a planarization condition of a pressure 3 Pa and an RF power of 20 W using a mixed gas of an oxygen gas (17 vol %) and $CHF_3$ (83 vol %) as an etching gas for 330 seconds.

After ashing was performed on the sacrificial layer, the sample was observed.

As a result, in all of 9 patterns on the 6-inch plane, a range having a size of 25 mm square in which a pattern was formed was uniform in appearance. However, when a nitrogen blow of 0.5 MPa was performed, 8 samples except 18-5 illustrated in FIG. 7 were changed so that scattered light can be generated.

After that change, a central part of the pattern was cut, and its cross section was observed through an electronic microscope. As a result, the second layer was partially blown off. Therefore, it was found that a planarizing method using a polishing technique was more preferable.

Example 2

In the present example, as with Example 1, a stopper layer made of aluminum oxide was further provided on the top surface of the second structural body of the optical element obtained in Example 1. Then, covering with a sacrificial layer was performed, and a planarizing process was performed through polishing.

Thereafter, a third structural body which had the same structure as the first structural body of Example 1 was formed on the planarized layer. Ashing was performed on the sacrificial layer, whereby a sample was obtained.

The obtained base was cut to obtain 9 sample pieces. The sample pieces were each sandwiched by a 45° prism, which was made of SF6 optical glass, in an optical contact state, and then the spectral characteristics were evaluated.

Incidentally, the bonding direction was determined so that line directions of the first and the third structural bodies were parallel to an oblique surface of the prism. The result was illustrated in FIG. 8.

Figure 8:
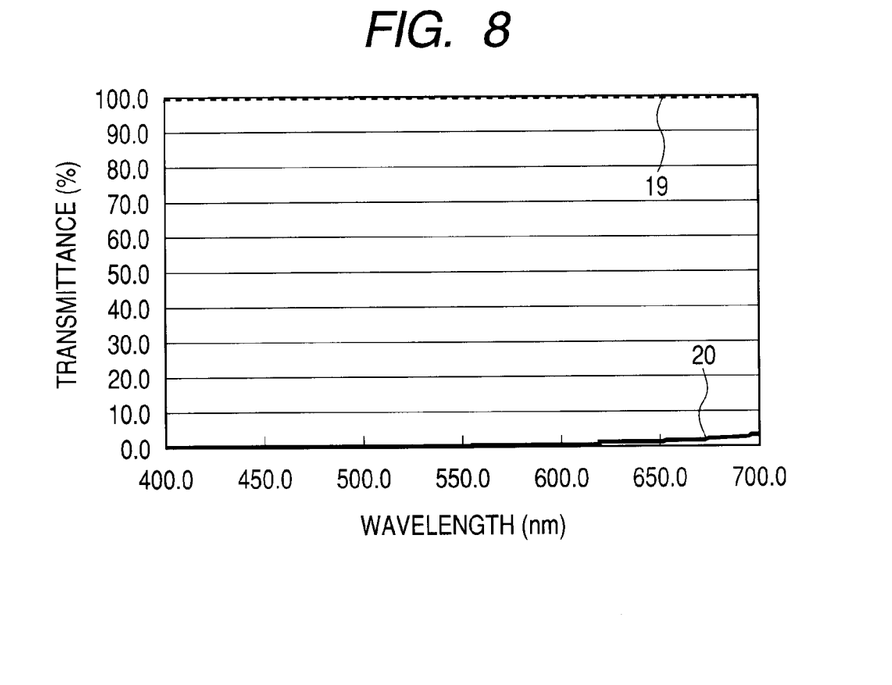
FIG. 8 is a graphical representation illustrating a spectral characteristic of a polarizing beam splitter according to Example 2 of the present invention.

FIG. 8 is a graph illustrating the spectral characteristics of the polarizing beam splitter. In the graph, the abscissa indicates wavelength, and the ordinate indicates transmittance.

Furthermore, a broken line 19 indicates P-polarized light transmittance, and a solid line 20 indicates S-polarized light transmittance.

As a result, a polarizing beam splitter having high polarization characteristics was obtained.

Furthermore, the variation in the obtained spectral characteristics is small, and it turned out that a uniform structure was obtained in the entire surface of the base.

Comparative Example 1

In Comparative Example 1 which is compared with Example 2, a polarizing beam splitter sample was produced according to a conventional method in which a stopper layer was not formed.

Incidentally, the planarizing process was performed for 200 seconds using polishing. Similarly, the sample was sandwiched by a prism, and spectral characteristics were measured. The result was shown in FIG. 9.

Figure 9:
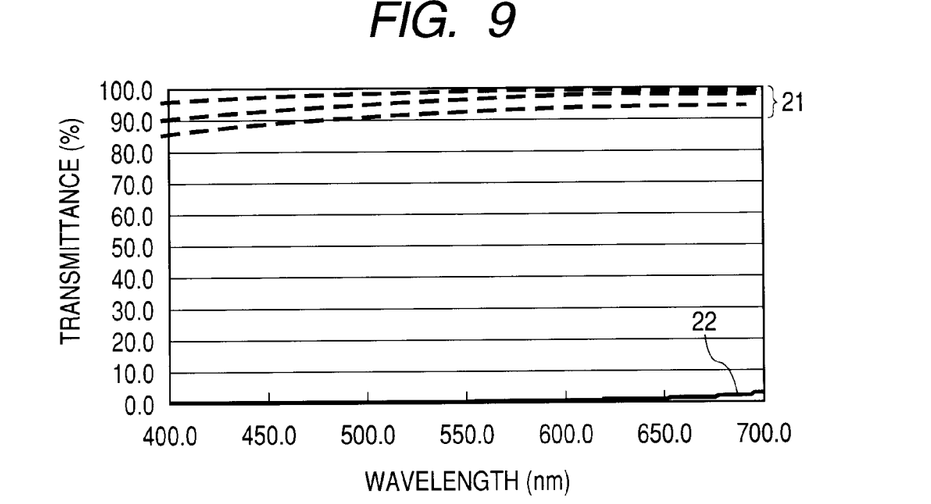
FIG. 9 is a graphical representation illustrating a spectral characteristic of a polarizing beam splitter according to Comparative Example 1.

FIG. 9 is a graph illustrating the spectral characteristics of the polarizing beam splitter which was produced according to the conventional method. In the graph, the abscissa indicates wavelength, and the ordinates indicates transmittance.

Furthermore, a broken line 21 indicates P-polarized light transmittance, and a solid line 22 indicates S-polarized light transmittance. As a result, the S-polarized light did not greatly change, but it was found that the transmittance of the P-polarized light lowered. Furthermore, a variation in the spectral characteristics in a 6-inch wafer was found.

In FIGS. 7, 18-1, 18-3, 18-7, and 18-9 were lowest in transmittance, 18-2, 18-4, 18-6, and 18-8 were next lowest in transmittance, and a sample which was highest in transmittance is 18-5, but the transmittance was low compared to Example 2.

Each of the samples was cut, and its cross section was observed through an electronic microscope. It was found that the first structural body was over-etched. It was also found that the over-etching depth was deeper in proportion to the lowering of the spectral characteristics.

Example 3

In the present example, the third embodiment was applied to the base in which the polishing process was finished in Example 1, and the following processes were performed.

An RIE etching system was used to etch-back the sacrificial layer which was present between the etching stopper layers, so that a gap was formed between the adjacent etching stopper layers (FIG. 5F).

As the etching-back conditions, a mixed gas of oxygen gas (17 vol %) and $CHF_3$ (83 vol %) was used as an etching gas, and ashing was performed at a pressure of 3 Pa and an RF power of 20 W for 10 seconds. In the base in which the process was completed, a gap 14 was formed between the etching stopper layers.

Film formation was performed on the base which includes the gap between the etching stopper layers, followed by patterning and etching to form the second structural body (FIG. 5G).

Ashing of the sacrificial layer was performed to form a hollow part (FIG. 5H).

In addition, the same process as in Example 2 was performed to obtain a polarizing beam splitter.

The S-polarized light transmittance of the thus obtained polarizing beam splitter was lower than that of Example 1, and it was found that the polarization characteristics were improved.

Example 4

In Example 4, a configuration of the first embodiment was applied to configure an optical element with a three-dimensional structural body. Here, the etching stopper layer was made of $AL_2O_3$ which was a stoichiometric composition.

When the etching stopper layer was formed using a sputtering process, the process parameters such as oxygen partial pressure, sputtering power and pressure were changed, so that oxygen was made deficient. Thereby, it was possible to obtain higher etching rate selectivity.

Example 5

In Example 5, a configuration of the first embodiment was applied to configure an optical element with a three-dimensional structural body. Here, the etching stopper layer was made of $HfO_2$.

In the present example, it was possible to stably produce an optical element without a variation in optical characteristics. Here, when oxygen was made deficient as with Example 4, it was possible to obtain a more higher etching rate selectivity.

Example 6

In Example 6, the configuration of the first embodiment was applied to configure an optical element with a three-dimensional structural body. Here, the etching stopper layer 9 was made of $ZrO_2$.

In the present example, it was possible to stably produce an optical element without a variation in optical characteristics. Here, when oxygen was made deficient as with Example 4, it was possible to obtain a more higher etching rate selectivity.

Example 7

In Example 7, the configuration of the first embodiment was applied to configure an optical element with a three-dimensional structural body. Here, the etching stopper layer 9 was made of $Y_2O_3$.

In the present example, it was possible to stably produce an optical element without a variation in optical characteristics. Here, when oxygen was made deficient as with Example 4, it was possible to obtain a more higher etching rate selectivity.

The optical element with the three-dimensional structural body which is obtained according to the embodiments and the examples described above may be applied to optical elements of cameras, projectors, optical pick-up devices, and optical communication fields.

While the present invention has been described with reference to exemplary embodiments, it is to be understood that the invention is not limited to the disclosed exemplary embodiments.

This application claims the benefit of Japanese Patent Application No. 2008-193696, filed Jul. 28, 2008, and Japanese Patent Application No. 2009-155699, filed Jun. 30, 2009, and Japanese Patent Application No. 2009-167908 filed on Jul. 16, 2009 which are hereby incorporated by reference herein in their entireties.

The invention claimed is:

1. A method of producing an optical element comprising a first structural body and a second structural body on a base, the method comprising the steps of:
   forming a first structural body in which a space part and a structural part are alternately and repeatedly arranged;
   forming an etching stopper layer on an upper part of the structural part;
   covering the structural part and the etching stopper layer with a covering material;
   polishing the covering material to thereby form a planarizing part on the etching stopper layer; and
   forming a second structural body on the planarizing part by etching.

2. The method according to claim 1, further comprising, after the polishing step, etching back the covering material.

3. The method according to claim 1, further comprising forming a plurality of layers between the base and the first structural body.

4. The method according to claim 1, wherein the first structural body is formed of any of titanium oxide, silicon oxide, a mixed film of titanium oxide and silicon oxide, a mixed film of titanium oxide and zirconium oxide, and a mixed film of titanium oxide and hafnium oxide.

5. The method according to claim 1, wherein the etching stopper layer is formed of a material selected from aluminum oxide ($Al_2O_x$, $x \le 3$), zirconium oxide ($Z_rO_x$, $x \le 2$), hafnium oxide ($H_fO_x$, $x \le 2$), and yttrium oxide ($Y_2O_x$, $x \le 3$).

6. The method according to claim 1, wherein the first structural body is formed of any of a line and space structure, a hole structure and a dot structure.

7. The method according to claim 1, wherein the second structural body is formed of any of a line and space structure, a hole structure and a dot structure.

* * * * *

UNITED STATES PATENT AND TRADEMARK OFFICE
CERTIFICATE OF CORRECTION

PATENT NO. : 8,941,920 B2
APPLICATION NO. : 13/055663
DATED : January 27, 2015
INVENTOR(S) : Arai et al.

Page 1 of 1

It is certified that error appears in the above-identified patent and that said Letters Patent is hereby corrected as shown below:

In the Title page, Item (22), after the phrase "PCT Filed:"

Delete "Jul. 7, 2009" and insert instead -- Jul. 27, 2009 --.

Signed and Sealed this
Twelfth Day of April, 2016

Michelle K. Lee
*Director of the United States Patent and Trademark Office*